Jan. 31, 1967   J. P. REILLY   3,301,234
POSITIVE DISPLACEMENT INTERNAL COMBUSTION ENGINE
Filed Aug. 21, 1964   4 Sheets-Sheet 1

INVENTOR
JOSEPH P. REILLY

JOSEPH P. REILLY
INVENTOR.

BY William R. Piper
ATTORNEY

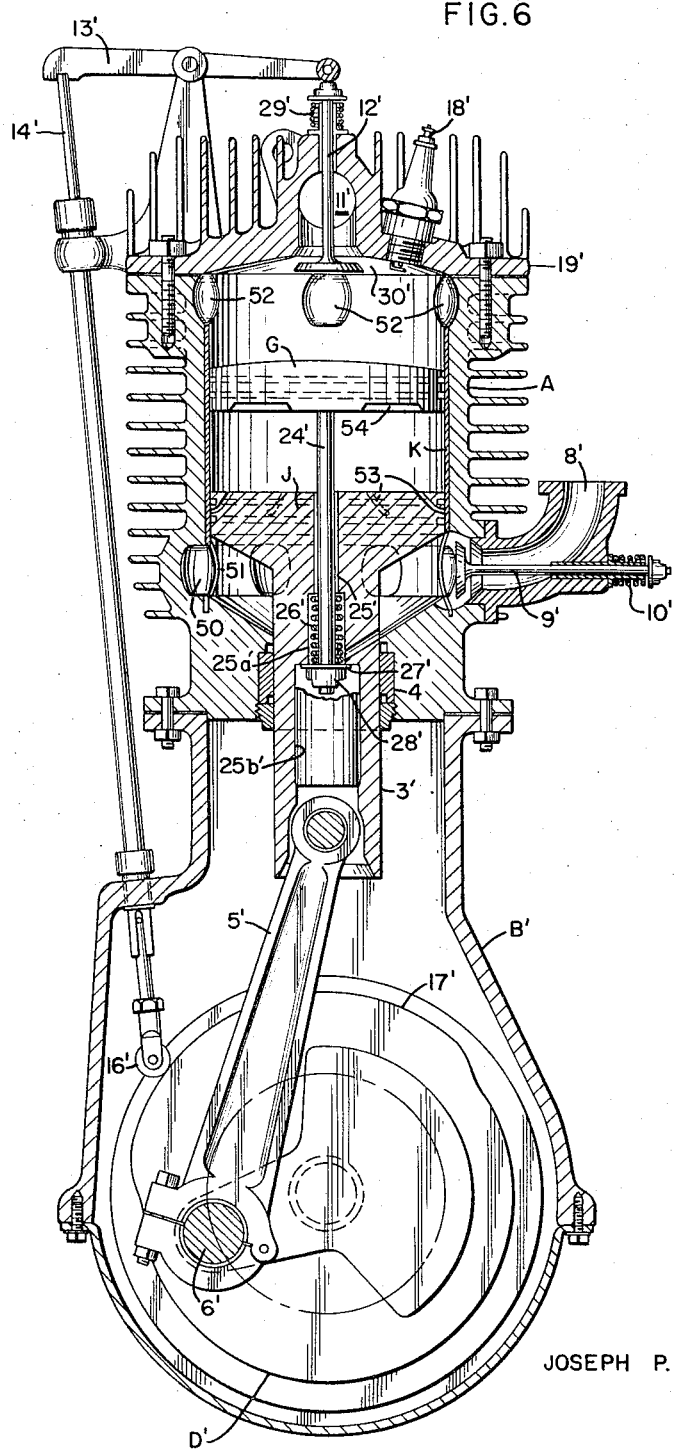

Jan. 31, 1967　　　　　　　J. P. REILLY　　　　　　　3,301,234
POSITIVE DISPLACEMENT INTERNAL COMBUSTION ENGINE
Filed Aug. 21, 1964　　　　　　　　　　　　　　4 Sheets-Sheet 4

JOSEPH P. REILLY
INVENTOR.

BY William R. Piper
ATTORNEY

United States Patent Office 3,301,234
Patented Jan. 31, 1967

3,301,234
POSITIVE DISPLACEMENT INTERNAL
COMBUSTION ENGINE
Joseph P. Reilly, 300 Elmhurst St.,
Hayward, Calif. 94544
Filed Aug. 21, 1964, Ser. No. 391,248
4 Claims. (Cl. 123—47)

The present invention relates to improvements in a positive displacement internal combustion engine, and it consists in the combination, construction and arrangement of parts as hereinafter described and claimed.

An object of my invention is to provide modified forms of the reciprocating piston pulse jet engine disclosed in my copending patent application, Serial No. 274,542, filed April 22, 1963, now Patent No. 3,163,001. In the copending case the two cycle engine has a cylinder with an intake port at one end and a jet outlet nozzle at the other end. A piston reciprocates within the cylinder and it contains a transfer chamber for receiving a combustible mixture from the inlet end of the cylinder and for transferring this to the other end of the cylinder where it is compressed and ignited and the exploding gases are then forced out through the jet outlet nozzle for giving a forward thrust to the engine and to any airplane or vehicle to which the engine is attached.

My present engine design makes use of the internal combustion principle of reciprocating a piston and causing it to rotate a crank shaft rather than have the exploding gases expelled through a jet outlet nozzle. A cam-controlled exhaust valve takes the place of the plug on the disc valve used in my copending engine case, Serial No. 274,542, for closing the orifice of the jet outlet nozzle during a portion of the operating cycle. In the copending case the plug on the disc valve does not open the jet outlet nozzle until a more complete burning of the combustible mixture has taken place in the firing chamber. The initial force of the explosion in the copending case is used for moving the disc valve and piston for imparting rotation to the crank shaft and the remaining force is expended in propelling the burning gases through the jet outlet nozzle for giving a forward thrust to the engine and to the aircraft or vehicle to which it is attached. In the present case all of the power thrust of the exploding and burning gases in the firing chamber is utilized in rotating the crank shaft.

A modified form of my positive displacement internal combustion engine does away with placing the gas transfer chamber in the piston. Therefore the transfer valve and the check valve used for controlling the flow of gas into and out of the transfer chamber in the piston are eliminated. The functions of these two valves are performed by a piston of a different design. A sleeve liner is placed between the piston periphery and the wall of the cylinder in the modified form of engine. The gas transfer chamber is formed in an annular cavity in the cylinder wall and this transfer chamber communicates with the interior of the cylinder through ports provided in the sleeve liner.

The present two cycle engine has all of the advantages of a four cycle engine. There is regenerative cooling by the new charge of a combustible mixture entering the bottom of the cylinder as the piston moves upwardly. The new gas helps to cool the piston and in turn the gas is preheated before being exploded. Also the air and fuel are mixed more intimately in the cylinder. The explosive mixture of the air and fuel is mixed still further as the mixture is forced into the transfer chamber provided in the piston. Also more heat is extracted from the piston and is absorbed by the combustible mixture. The gas is then moved from the transfer chamber into the cylinder space between the top of the piston and the underside of the disc valve. The gas will expand slightly as it makes this move and will absorb heat from the piston, disc valve and from the cylinder wall. The gas is finally transferred from the space under the disc valve into the firing chamber above the disc valve and when full compression of the gas has taken place the spark plug will ignite the combustible mixture and produce the power stroke.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 6 is a vertical section through a modified form of the engine.

Figure 1:
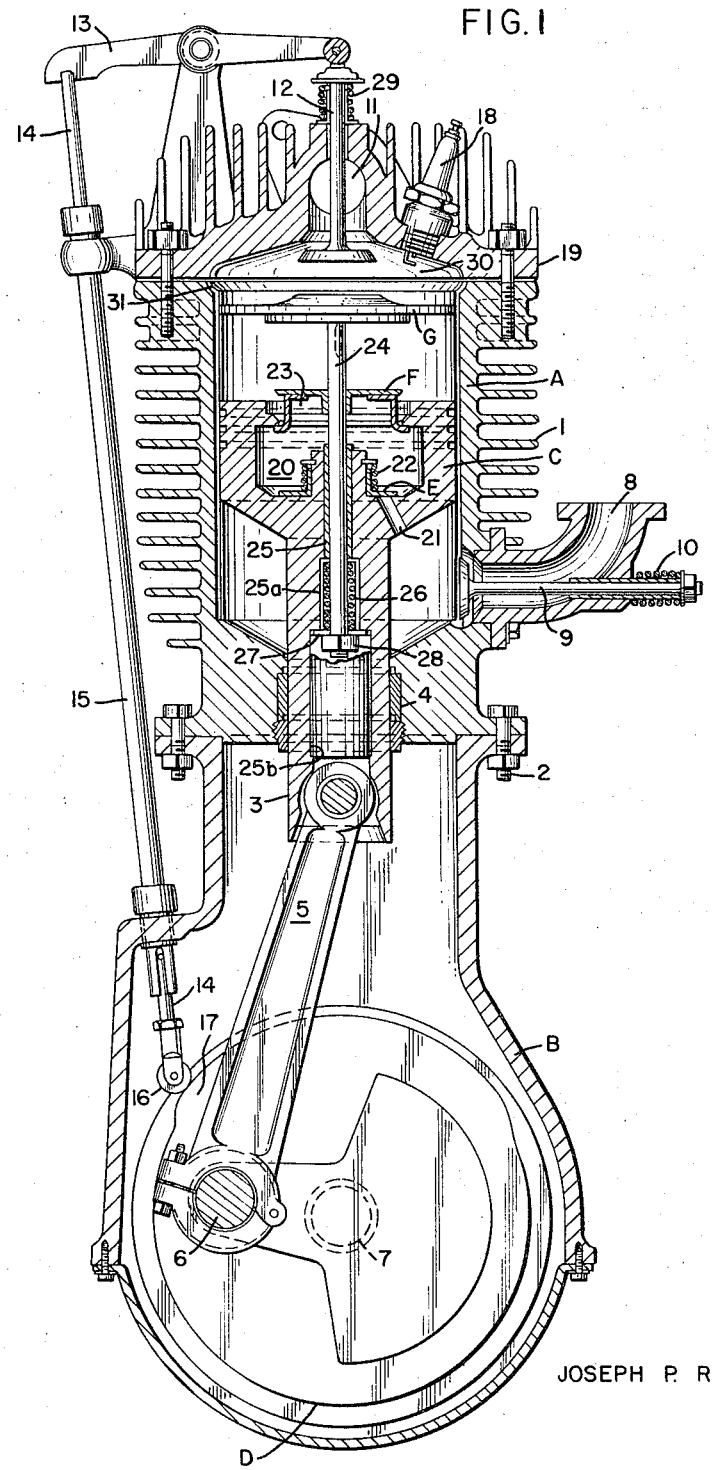
FIGURE 1 is a vertical section through the engine.

While I have shown only the preferred forms of my invention, it should be understood that various changes, or modifications, may be made within the scope of the annexed claims without departing from the spirit thereof.

Detailed description

In carrying out my invention, I provide an engine having an air-cooled cylinder A. This cylinder has outwardly extending fins 1 for dissipating the heat from the engine. A crank case B is secured to the bottom of the cylinder by bolts 2 or other suitable fastening means. A piston C of novel construction is slidably mounted in the cylinder A and it has a cylindrical portion 3 that is slidably received in a bearing 4 that in turn is carried by the base of the cylinder A. The cylindrical portion 3 could be likened to a rigid piston rod and a connecting rod 5 is pivotally connected to the lower end of the cylindrical portion 3.

The other end of the connecting rod is pivotally connected to a crank shaft 6. The crank shaft is rotatably supported at 7 to the crank case B.

The cylinder A has an intake port 8 that communicates with the bottom of the cylinder. A spring-biased intake valve 9 has a spring 10 that yieldingly keeps the valve closed so that the intake port 8 is closed. The intake port 8 communicates with a carburetor, not shown, so that a combustible mixture will be fed by the carburetor and will pass through the intake port or manifold and enter the bottom of the cylinder A.

The top of the cylinder A is closed by an engine head 19 which has an exhaust port 11 therein. A spring-biased exhaust valve 12 closes the exhaust port at certain intervals during the operation of the engine. A rocker arm 13 has one end bearing against the stem of the exhaust valve for opening the valve when a push rod 14 is moved upwardly. The push rod is slidably received in a guide sleeve 15 and the upper end of the push rod engages with the adjacent end of the rocker arm. The lower end of the push rod 14 carries a cam follower roller 16 and this roller rides on a cam D. The cam rotates with the crank shaft 6 and the cam has a high point 17 for a purpose hereinafter described. A spark plug 18 is mounted in the engine head 19 that closes the top of the cylinder A.

The piston C has a transfer chamber 20 for receiving combustible gases from the lower portion of the cylinder and for transferring these gases into the cylindrical portion disposed above the piston. The piston has passages 21 that extend from the underside of the piston and communicates with the transfer chamber 20. A transfer valve E is mounted in the transfer chamber and a coil spring 22 yieldingly keeps the transfer valve closed.

The top of the transfer chamber 20 opens into the portion of the cylinder A disposed above the piston and a check valve F normally keeps the top of the transfer chamber closed. The check valve F has guide legs 23 that will aid in keeping the check valve centered and these legs have outwardly turned ends that will prevent the check valve from being entirely removed from the piston.

I provide a disc valve G and this valve has an outer diameter equal to the inner diameter of the cylinder A. The disc valve has a valve rod 24 that extends downwardly through a central opening in the check valve F and is slidably received in a bore 25 provided in the cylindrical portion 3 of the piston C. The bore 25 is enlarged at 25a and a coil spring 26 is received in this enlarged bore portion and encircles the part of the valve rod 24 that is received in the same portion. The lower end of the valve rod has a washer 27 mounted thereon and the lower end of the coil spring 26 bears against this washer. A nut 28 is threaded onto the threaded lower end of the valve rod 24 and this nut holds the washer 27 in place. The bore 25 is again enlarged at 25b to receive the washer 27 and the nut 28. The purpose for the disc valve G will be set forth when describing the operation of the engine.

Operation

From the foregoing description of the various parts of the device the operation thereof may be readily understood. FIGURES 2 to 5 inclusive show four diagrammatic views that illustrate the operation of the engine. Assume that the crank shaft 6 has been rotated through two or more revolutions and the parts are in the firing position shown in FIGURE 2. The piston C will be at the top of its stroke and the disc valve G will be resting on the top of the piston. The check valve F will be closed so as to close the top of the transfer chamber 20 and the intake valve 9 will also be held in closed position by its spring 10. The cam following roller 16 will be on the low side of the cam D and therefore the spring 29 for the exhaust valve 12 will hold the exhaust valve in closed position.

Figure 2:
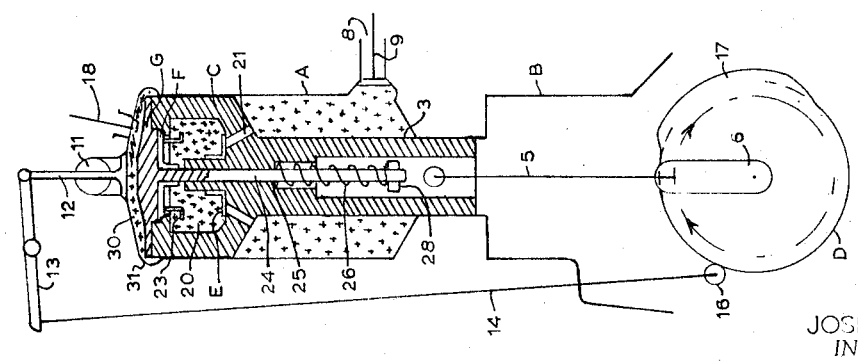
FIGURE 2 is a diagrammatic view of the engine with the cylindrical walls and crank case being indicated by single lines. The working parts of the engine are shown in a position where the spark plug ignites the compressed combustible mixture.
Figure 10:
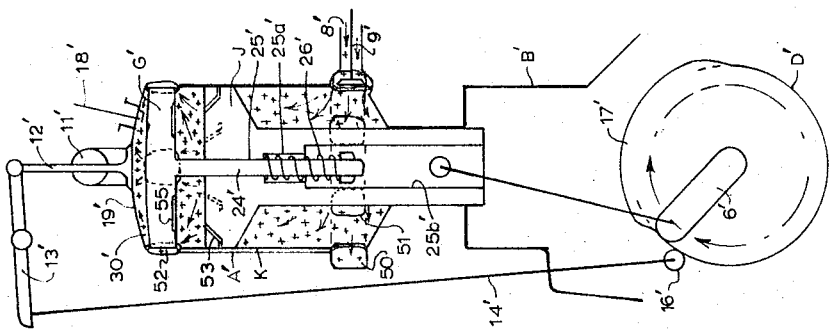
FIGURE 10 is a diagrammatic view of the modified form of engine and shows the piston forcing a new combustible mixture past the periphery of a disc valve and into the firing chamber of the engine preparatory to the spark plug igniting the mixture.

The ignition circuit is not illustrated but when the parts are in the position shown in FIGURE 2, the spark plug 18 will fire and will explode the gases that have been compressed into the firing chamber 30 in the top of the cylinder and also in the cylinder or engine head 19. The exploding gases will drive the disc valve G in the piston C downwardly as clearly shown in FIGURE 3. This is the power stroke of the two cycle engine and the downward movement of the piston C will act on the connecting rod 5 and rotate the crank shaft 6 and the cam D in a clockwise direction. The lower portion of the cylinder A shown in FIGURE 2 has been filled with a new combustible mixture and this gas is trapped in the cylinder by the closing of the intake valve 9. The gases in the lower portion of the cylinder which is the intake chamber are compressed by the downwardly descending piston C in FIGURE 3 and these compressed gases will flow through the passages 21 in the piston and will enter the transfer chamber 20 which is formed within the piston. The inflowing gases into the transfer chamber 20 will open the transfer valve E and compress its spring 22. The transfer chamber 20 is smaller in capacity than the largest capacity of the intake chamber which is formed in the cylinder A and is bounded by the bottom of the piston C when at the top of its stroke and the bottom of the cylinder. The check valve F is held in closed position by the disc valve G and the latter is kept in contact with the top of the piston by the force of the exploding gas in the firing chamber.

Figure 4:
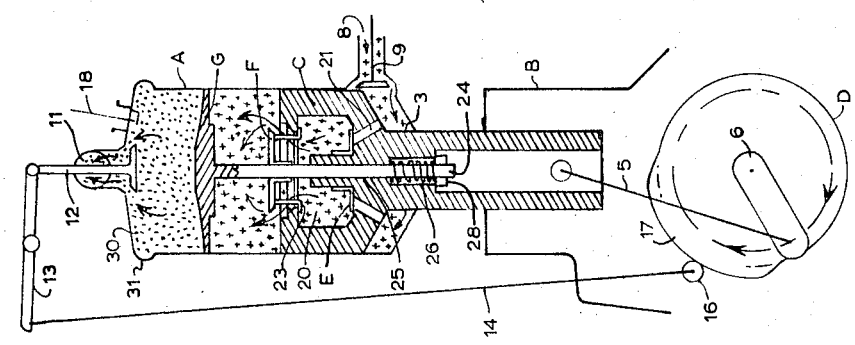
FIGURE 4 is a diagrammatic view showing the engine cylinder receiving another supply of a combustible mixture and further illustrates the expelling of the burned gases through the exhaust port.
Figure 3:
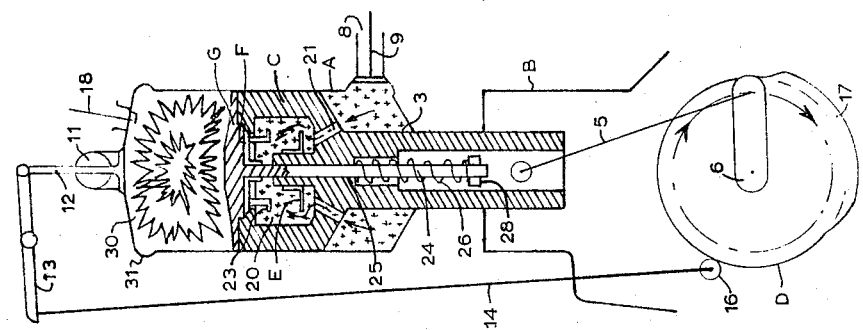
FIGURE 3 is a diagrammatic showing of the engine and illustrates the parts during the firing stroke.

It will be noted from FIGURE 3 that as the piston C moves into the lower portion of the cylinder A, practically all of the fuel mixture in the cylinder will be forced into the transfer chamber and the transfer valve E will close under pressure of the spring 22 when the gas transfer ceases at the bottom of the stroke. Also as the piston C reaches the bottom of the cylinder A, the cam D will have its enlarged portion 17 come into contact with the cam follower roller 16 and cause the roller to lift the push rod 14 and rock the rocker arm 13 for opening the exhaust valve 12 against the compression of the spring 29. This will permit the exhaust gases to escape through the exhaust port 11 as shown in FIGURE 4. When the pressure of the gases within the top of the cylinder A is about equal to the pressure of the gases compressed in the transfer chamber 20, then the gases in the transfer chamber will open the check valve F and move into the portion of the cylinder bounded by the top of the piston C and the underside of the disc valve G.

FIGURE 4 shows the piston C moving on its upstroke and illustrates how the escaping gases from the transfer chamber 20 will lift the disc valve G above the top of the piston C even though the piston is moving upwardly at this particular portion of the operative cycle. The upward movement of the disc valve G will aid in expelling the exhaust gases from the top of the cylinder and cause these gases to flow out through the exhaust port 11.

As the piston C rises in the cylinder A as shown in FIGURE 4, a vacuum will be created in the bottom of the cylinder and below the bottom of the piston and this vacuum is sufficient to open the intake valve 9 and permit the new combustible mixture from the carburetor, not shown, to enter the bottom of the cylinder. The intake valve 9 is opened by atmospheric pressure. While the new gas mixture is entering the bottom of the cylinder A, the compressed gas mixture in the transfer chamber 20 is moving from the transfer chamber and entering the space between the top of the piston and the under side of the disc valve.

Figure 5:
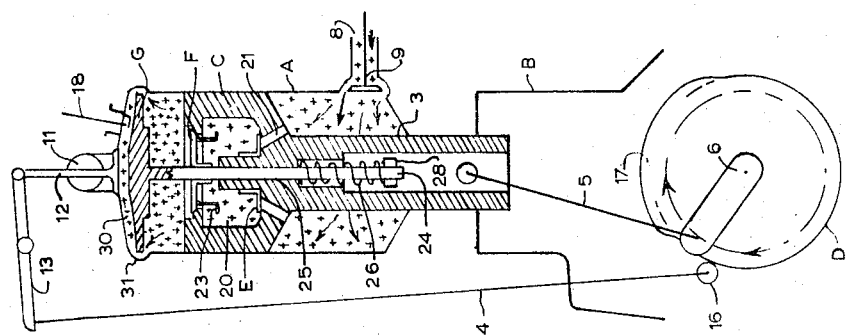
FIGURE 5 is a diagrammatic view of the engine showing the piston forcing a combustible mixture into the firing chamber and compressing this combustible mixture preparatory to the next firing by the spark plug.

In FIGURE 5, the rotating cam D has moved the enlarged cam portion 17 beyond the cam follower roller 16 and the push rod 14 has moved downwardly and permitted the rocker arm 13 to free the exhaust valve 12 and permit it to close under the force of the coil spring 29. It will be noted from FIGURE 5 that the disc valve G has moved into its uppermost position. The cylinder A has an annular enlargement 31 and therefore a space is provided around the rim of the disc valve G that will permit the compressed gases under the disc valve to pass around the valve and be forced into the top of the cylinder and above the top of the disc valve. The pressure of the gases trapped between the top of the piston and the underside of the disc valve will be sufficient to close the check valve F and prevent any return flow of gases into the transfer chamber.

During the upward movement of the piston in FIG-URE 5, the portion of the cylinder A disposed below the piston is constantly being enlarged as to capacity and this will draw in more combustible fuel through the intake port 8 and past the intake valve 9. However, when the piston C is in its uppermost position as shown in FIGURE 2, the intake valve 9 which is lightly spring loaded will automatically close. At the moment of firing of the gases caused by the spark plug 18 in FIGURE 2, all of the valves will be closed and the gases in the top of the cylinder will be under extreme compression and ready for ignition. The cycle is then repeated.

During the upstroke a uniform air volume is drawn into the intake chamber to be transferred by positive displacement to the transfer chamber to provide a uniform air volume to the firing chamber. This feature permits qualitative governing of the engine by limiting fuel introduction to the exact amount desired for high efficiency at any power output level.

In contrast, engines of the prior art which have relatively low peak efficiencies further reduce their efficiency by choking the air intake to regulate engine speed causing a disproportionate use of fuel which is extremely wasteful at low speeds.

My invention provides thorough purging of the exhaust gases which are positively displaced by the disc section of the valve rod during the upstroke. This provides high volumetric efficiency comparable to four cycle engines. It will be noted that virtually complete exhaust purging could be secured by adjusting the timing of exhaust valve closure to occur after a small amount of fuel-air mixture has entered the firing chamber.

In contrast, two cycle engines of the prior art are noted for their low volumetric efficiency and the carry-over of significant volumes of exhaust gas.

The engine of my invention employs the reliability of carburetion with fuel metered by needle jets and if desired, without the disadvantage of a butterfly valve in the venturi. The fuel and air are thoroughly mixed by the pressures and turbulence created in each chamber up to and including the firing chamber. The combustibility of the fuel air mixture is further enhanced by the preheating which it receives during its passage to the firing chamber thereby assuring the fullest utilization of the fuel.

In contrast, engines of the prior art suffer from incomplete mixing of the fuel and air mixture and lack of preheating results in incomplete vaporization of the fuel, both circumstances contributing to fuel waste.

The positive displacement internal combustion engine provides regenerative cooling to reduce fuel waste as lost heat. By compressing the fuel-air mixture in the intake chamber the heat of compression is confined to the lower section of the engine and that compressed mixture on its release from the transfer chamber absorbs the heat of the piston head, the cylinder walls, the valve rod disc and then carries that heat back to the firing chamber to contribute to the power of the next explosion.

In contrast, engines of the prior art make little use of the regenerative effect in the introduction of the fuel and air mixture.

The features of the positive displacement internal combustion engine combine to assure the most complete combustion of the fuel. The reduction of the products of incomplete combustion in the exhaust while conserving fuel also eliminates the elements which cause atmospheric pollution. Anti-smog devices would therefore be unnecessary on this new engine.

In contrast, engines of the prior art discharge a considerable portion of their incompletely burned fuel from the exhaust, particularly when they are choked down to operate at low speeds as in city traffic.

The high efficiency of the positive displacement internal combustion engine with its consequent great reduction in size provides for easier manufacture and maintenance by halving the number of cylinders despite the greater complexity of the new piston assemblies. Furthermore, the high torque characteristics of the new engine will reduce the need for high engine revolutions per minute in order to secure power.

In contrast, engines of the prior art are relatively crude and bulky, they are inefficient at all speeds, and they are particularly wasteful at low speeds. They are also the major source of atmospheric pollution.

The engine lends itself in design to be used as a diesel engine if fuel injectors are substituted for spark plugs.

Modified form of engine

In FIGURES 6 to 10 inclusive, I show a slightly modified form of my invention on a positive displacement combustion engine. Many parts of the modified form are the same as that disclosed in the form shown in FIGURES 1 to 5 inclusive and like letters and reference numerals will be applied to corresponding parts except that the letters and reference numerals of the parts shown in FIGURES 6 through 10 inclusive will be primed. In FIGURE 6, I show the air cooled cylinder A' as having a crank case B' and a removable oil pan. A piston J is slidably mounted in the cylinder and it has a cylindrical portion 3' or a rigid piston rod that is slidably mounted in a bearing 4'. A connecting rod 5' is pivotally connected to the lower end of the rigid piston rod and has its other end connected to a crank shaft 6'.

A cylindrical liner K is mounted in the cylinder A' and the periphery of the piston J slidably contacts with the inner surface of the liner. A disc valve G' is slidably mounted above the top of the piston J and the piston has a central bore 25' for slidably receiving a rod 24' that is integral with the disc valve G' and is centrally disposed with respect to the valve. The bore 25' is enlarged at 25a' and a coil spring 26' is mounted in the enlarged portion of the bore and encircles the rod 24' for the disc valve G'. The bore is enlarged again at 25b' and the lower end of the rod 24' projects into this enlarged bore portion and is provided with a washer 27' and a nut 28', the latter being threaded upon the threaded portion of the rod 24'.

The cylinder A' is provided with an annular recess 50 in its lower end. The cylindrical liner K has openings 51 adjacent to its lower end and these openings register with the annular recess 50. The annular recess 50 and the cylindrical liner K cooperate to form a transfer chamber for receiving gases and this will be explained hereinafter.

An intake manifold or port 8' communicates with the annular recess 50 in the cylinder A'. The inlet port is connected to a carburetor, not shown. An inlet valve 9' has a spring 10' that normally keeps the valve closed. However, when a partial vacuum is formed within the cylinder A' and below the piston J, the atmospheric pressure is sufficient to force a new combustible mixture through the intake port 8' and to open the intake valve 9'.

The top of the cylinder A' is closed by a header or engine head 19'. This header has an exhaust port 11' and an exhaust valve 12' has a spring 29' for keeping the valve closed. A rocker arm 13' moves the exhaust valve 12' into open position when the rocker arm is actuated by a push rod 14'. FIGURE 6 shows the lower end of the push rod provided with a cam follower roller 16' and this rides on a cam D'. The cam is rotated with the crank shaft 6' and the cam has a high portion 17'.

The cylindrical liner K has openings 52 and these openings provide communication between the firing chamber 30' and the cylinder interior when the disc valve G' is in its uppermost position. A spark plug 18' is mounted in the engine head 19' and forms a part of an ignition circuit, not shown, that will cause the spark plug to ignite the compressed gases in the top of the cylinder at a certain point in the cycle of the engine.

Figure 8:
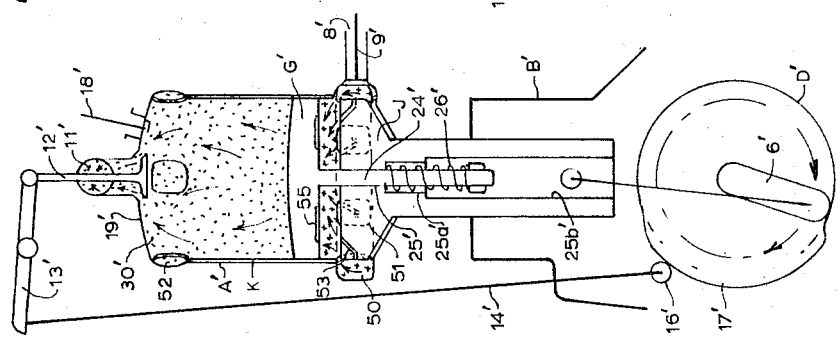
FIGURE 8 is a diagrammatic showing of the modified form of engine and the piston has been moved to the bottom of the cylinder by the firing stroke and has started on its upward movement for expelling the burnt gases through the exhaust port.

The piston J has a plurality of inclined passages 53 and these passages commuicate with the annular recess 50 when the piston is in its lowermost position as shown in the diagrammatic view of FIGURE 8. The underside of the disc valve G' has a wide circular groove 54. The purpose of this groove will be explained during the description of the operation of the engine.

*Operation of modified form of engine*

The operation of the modified form of my positive displacement internal combustion engine is somewhat simpler than that of the form shown in FIGURES 1 to 5 inclusive because the transfer valve E and the check valve F are eliminated and their functions are performed by both the disc valve G' and the location of the transfer chamber in the annular recess 50 in the wall of the cylinder A'. If we assume the engine has been cranked for two or more revolutions of the crank shaft 6', then there will be a dense fuel-air mixture in the firing chamber 30' and a slightly less than atmospheric pressure fuel-air charge in the portion of the cylinder A' disposed below the piston J. The fuel air charge will also be received in the annular recess 50 which performs as a transfer chamber in this modified form. The annular recess 50 is in communication with the intake chamber in the lower portion of the cylinder A' and this communication is provided by means of the openings 51 in the cylinder sleeve K.

Figure 7:
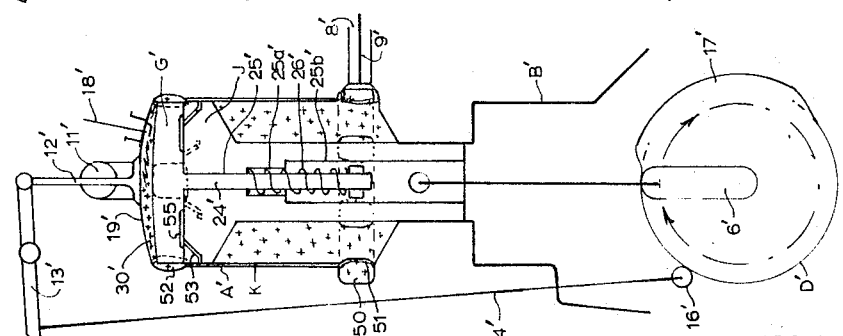
FIGURE 7 is a diagrammatic view of the engine shown in FIGURE 6 and the cylinder and crank case are shown by single lines. The moving parts of the engine shown in FIGURE 7 illustrate the engine at the moment of firing by a spark plug.

At the moment of ignition by the firing of the spark plug 18' in FIGURE 7, the exhaust valve 12' and the intake valve 9' are both closed. It is to be understood that during the power stroke or the full downward movement of the piston J in the cylinder A', the fuel air mixture in the intake chamber of the cylinder that is formed below the piston will be forced into the annular transfer recess 50. The downward movement of the piston will force the gas mixture below it through the openings 51 in the sleeve K and into the annular recess 50. The inlet port 8' will be closed by the inlet valve 9' because the pressure in the cylinder is higher than the atmospheric pressure. The spring 10' will aid in closing the inlet valve.

Near the very bottom of the power stroke by the piston J, the cam D' will have its enlarged portion 17' contact the cam follower roller 16' and this will raise the push rod 14' and actuate the rocker arm 13' for opening the exhaust valve 12'. Also near the bottom of the downward stroke of the piston J the smaller angular vent passages 53 in the piston J will communicate with the openings 51 in the cylindrical sleeve K and will permit the compressed fuel-air mixture from the transfer chamber formed by the annular recess 50 to flow through these inclined passages 53 and enter the wide annular groove 54 provided on the underside of the disc valve G', see FIGURE 8. This will tend to force the disc valve upwardly and away from the top of the piston J.

Figure 9:
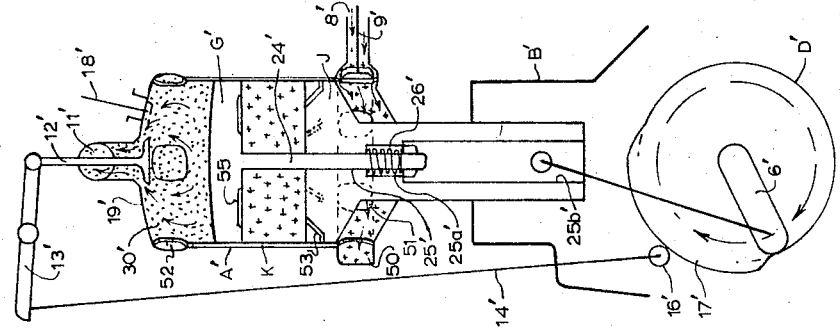
FIGURE 9 is a diagrammatic showing of the modified form of engine and the piston is illustrated as moving upwardly in the cylinder and a new charge of a combustible mixture is being drawn into the cylinder under the piston. The burnt gases in the top of the cylinder will still be forced out through the exhaust port.

When the exhaust valve 12' is opened by the cam D' as shown in FIGURE 8, the burned gases disposed above the disc valve G' will be exhausted through the exhaust port 11' and will escape to the atmosphere. This will lower the pressure in the upper part of the cylinder A' and the gases under pressure between the top of the piston and the bottom of the disc valve will lift the disc valve G' above the piston top as shown in FIGURE 9. The rapid movement of the disc valve G' above the top of the piston J will permit most of the fuel trapped in the annular recess 50 to flow from the recess and through the openings 51 in the sleeve K and then flow through the passages 53 to the cylindrical space between the top of the piston and the bottom of the disc valve. All of this takes place before the rising piston J closes off the lower cylinder ports 51 and then the cylinder will also close off the ports 53 in the piston to end transfer of gases from the transfer chamber into the space between the piston and the disc valve.

As the piston J continues on its upward movement in the cylinder A', the disc valve G' will move ahead of the top of the piston and will force the exhaust gases past the open exhaust valve 12, and through the exhaust port 11'. As the disc valve G' nears the top of the cylinder, the outer periphery of the disc valve will enter a section of the cylinder having several shallow ports 52 in the wall of the cylinder liner K at the top of the cylinder A'. The length of these openings 52 is greater than the thickness of the disc valve G' and therefore when the disc valve reaches the position shown in FIGURE 10 in its upward movement, the combustible gases disposed between the top of the piston J and the underside of the disc valve will escape into the openings 52 and then be forced into the top of the cylinder which now becomes the firing chamber 30'. The top of the cylinder is closed by the engine head 19'.

The cam follower roller 16' has moved off from the high point 17' of the cam D' and through the push rod 14' and rocker arm 13', and will permit the spring 29' to close the exhaust valve 12'. The piston J continues its upward movement in the cylinder A until the top of the piston contacts with the bottom of the disc valve G' as shown in FIGURE 7. The intake valve 9' will have been closed by its spring 10' and the parts are now ready for the firing stroke which is started by the spark plug 18' igniting the combustible compressed gases in the firing chamber.

I have explained one complete cycle of operation and the cycle repeats itself when the parts are in the position shown in FIGURE 7.

I claim:

1. In a positive displacement internal combustion engine:
   (a) a cylinder having an intake port at the end with a spring-biased intake valve therein;
   (b) a piston slidably mounted in said cylinder and having a transfer chamber formed therein; the portion of the cylinder lying between said piston and the intake port constituting an intake chamber;
   (c) said piston having gas passages placing said transfer chamber in communication with said intake chamber;
   (d) a spring-biased intake flap valve for said gas passages for permitting gas to flow only into said transfer chamber from said intake chamber;
   (e) a cylinder head closing the end of said cylinder that is opposite to said intake port end and having a firing chamber with an exhaust outlet;
   (f) a disc valve slidable in said cylinder and disposed between said piston and said cylinder head; the portion of the cylinder lying between said disc valve and said piston constituting a gas compressing chamber;
   (g) an exhaust valve for closing said exhaust outlet;
   (h) means for actuating said exhaust valve;
   (i) said piston having an opening placing said transfer chamber in communication with said compression chamber;
   (j) an exit flap valve for said piston opening and only permitting gas to flow from said transfer chamber into said compression chamber;
   (k) said cylinder having a bypass for conveying gases from said compression chamber into said firing chamber when said disc valve is at the top of its stroke, and said exhaust valve actuating means closes said exhaust valve; and
   (l) means for firing the compressed gases in said firing chamber when said piston moves adjacent to said disc valve.

2. The combination as set forth in claim 1: and in which
(a) said piston has a conical portion on its undersurface so as to give structural strength to the piston to offset any weakening of the piston due to it containing said transfer chamber.

3. In a positive displacement internal combustion engine:
(a) a cylinder having an intake port at one end with a spring-biased intake valve therein;
(b) a liner sleeve mounted in said cylinder and having a first annular row of openings disposed adjacent to one end of said cylinder and a second annular row of openings disposed adjacent to the other end of said cylinder;
(c) said cylinder having an annular transfer chamber provided at one end and communicating with said intake port and with said first annular row of openings in said sleeve;
(d) a cylinder head closing the end of said cylinder disposed opposite to said intake port and having a firing chamber with an exhaust outlet communicating therewith;
(e) a disc valve slidably mounted in said sleeve;
(f) a piston slidably mounted in said sleeve and having inclined gas passages communicating with said first annular row of openings when said piston is at the cylinder end disposed adjacent to inlet port; the inclined passages feeding gases from said transfer chamber into the portion of said sleeve interior lying between said piston and said disc valve for moving said disc valve above the top of said piston;
(g) an exhaust valve for closing said exhaust outlet;
(h) means for actuating said exhaust valve;
(i) said disc valve when at the top of the its stroke bisecting the second row of sleeve openings and causing these openings to act as a bypass for placing said firing chamber in communication with the space in said sleeve lying between said piston and disc valve, said exhaust valve operating means closing said exhaust valve when said disc valve is at the top of its stroke;
(j) means including a crank shaft for moving the piston toward the disc valve for transferring the combustible gases from a position between the disc valve and the piston into said firing chamber, the gases flowing through said bypass in said sleeve and being compressed in the firing chamber; and
(k) means for igniting the compressed combustible mixture in said firing chamber when said piston completes its movement toward said cylinder head and is brought into a close position to the underside of said disc valve;
(l) whereby both said disc valve and piston will be moved away from said firing chamber during the power stroke of said piston.

4. The combination as set forth in claim 3: and in which
(a) the face of said disc valve that is disposed opposite to the top of said piston is provided with an annular recess that registers with the inclined gas passages in said piston when the piston is moved close to said disc valve;
(b) whereby said annular recess in said disc valve will receive gases from said inclined gas passages and permit these gases to initially move said disc valve from said piston during the movement of both toward the cylinder head.

References Cited by the Examiner

UNITED STATES PATENTS

| | | | |
|---|---|---|---|
| 792,119 | 6/1905 | Clifton | 123—74 |
| 864,584 | 8/1907 | Wood | 123—47 |
| 907,196 | 12/1908 | Suckert | 123—74 |
| 1,136,715 | 4/1915 | Pitts | 123—73 |
| 1,568,964 | 1/1926 | Douglas | 123—74 |
| 1,753,354 | 4/1930 | Heibig | 123—74 |
| 2,401,111 | 5/1946 | Sanborn | 123—73 |

FOREIGN PATENTS 13,710    1910    Great Britain.

MARK NEWMAN, *Primary Examiner.*
WENDELL E. BURNS, *Examiner.*